United States Patent

Grisch et al.

[11] Patent Number: 5,971,732
[45] Date of Patent: *Oct. 26, 1999

[54] APPARATUS FOR MOLDING A PART

[75] Inventors: William E. Grisch, Elburn; Fred E. Grisch, St. Charles; Stephen P. Bondy, Geneva, all of Ill.

[73] Assignee: Applied Composites Corp., St. Charles, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/798,549

[22] Filed: Feb. 11, 1997

Related U.S. Application Data

[63] Continuation of application No. 08/321,274, Oct. 11, 1994, abandoned.

[51] Int. Cl.$^6$ .............................. B05B 5/025; B05B 1/28
[52] U.S. Cl. ........................... 425/98; 425/210; 118/622; 118/629; 118/326
[58] Field of Search ................................ 425/96, 98, 210; 118/300, 305, 308, 315, 323, 326, 622, 627, 50.1, 301, 629, 634

[56] References Cited

U.S. PATENT DOCUMENTS

| | | |
|---|---|---|
| Re. 28,068 | 7/1974 | Lemelson . |
| 3,216,877 | 11/1965 | Mohr . |
| 3,868,209 | 2/1975 | Howell ................................... 425/504 |
| 4,205,028 | 5/1980 | Brueggemann et al. . |
| 4,228,113 | 10/1980 | van Gasse . |
| 4,315,884 | 2/1982 | van Gasse . |
| 4,472,451 | 9/1984 | Mulder . |
| 4,499,235 | 2/1985 | Verwer et al. . |
| 4,615,057 | 10/1986 | Favreau . |
| 4,681,712 | 7/1987 | Sakakibara . |
| 4,749,350 | 6/1988 | Fritsch ................................... 425/575 |
| 4,759,946 | 7/1988 | Ribnitz . |
| 4,808,361 | 2/1989 | Castro et al. . |
| 4,940,012 | 7/1990 | Zimmerman et al. .............. 425/218 X |
| 4,980,113 | 12/1990 | Cummings et al. . |
| 5,000,902 | 3/1991 | Adams . |
| 5,296,183 | 3/1994 | Carbone et al. . |
| 5,304,332 | 4/1994 | Richart . |
| 5,348,697 | 9/1994 | Palmers et al. ....................... 425/96 X |
| 5,368,219 | 11/1994 | Hogan et al. . |

FOREIGN PATENT DOCUMENTS

| 0001012 | 3/1979 | European Pat. Off. ............... 425/210 |
|---|---|---|

*Primary Examiner*—Elizabeth McKane
*Attorney, Agent, or Firm*—Bell, Boyd & Lloyd

[57] ABSTRACT

A molding apparatus is provided which comprises a lower mold portion and an upper mold portion movable into engagement with the lower portion. A movable spray head is disposed on a traversing rack mounted within a retractable coating box. The coating box upper surface contains a first opening corresponding in size and shape to the outer periphery of the mold cavity of the upper mold and a second opening which corresponds in size and shape to the opening of an overspray recovery transition piece disposed at a position adjacent the fully disengaged upper mold portion. Prior to a molding operation, the coating box engages the upper mold permitting both the transition piece opening and cavity opening in the top surface of the box to align with the transition piece and cavity, respectively. The spray heads and drive of the traversing rack are activated and the overspray recovery transition piece fluidly communicates with an evacuated recovery booth, thereby causing the cavity of the upper mold to be coated and the overspray to be withdrawn into the recovery booth.

18 Claims, 3 Drawing Sheets

APPARATUS FOR MOLDING A PART

This application is a continuation of application Ser. No. 08/321,274 filed Oct. 11, 1994, now abandoned.

BACKGROUND OF THE INVENTION

The present invention relates generally to a molding apparatus which includes apparatus for coating the inner surface of a mold with a fluidized coating and recovering overspray prior to a molding operation.

Molded parts are readily manufactured from sheet molding compound ("SMC") which is molded into the desired shape within a pressurized mold. Such parts often exhibit poor surface quality (e.g., porosity, waviness, pits, etc.) and typically require special treatments with paint or liquid, in-mold coatings in the event colored surfaces are desired. Accordingly, significant expense may be incurred in improving the surface quality and painting or otherwise coating the surface of the parts.

One approach to eliminating costly post-molding treatments of a molded part is disclosed in U.S. Pat. No. Re 28,068 to Lemelson. This patent discloses an apparatus for selectively depositing a particulate coating against the surface of a mold. When the mold is subsequently filled with a molding material, the coating and the molding material fuse so as to form an integral structure.

U.S. Pat No. 4,205,028 discloses an apparatus for coating the interior surface of a mold with a coating which forms a surface coating on a product molded from sheet molding compound. The coating is an electrostatically charged powdered thermosetting resin which is sprayed onto the heated interior surface of the mold before the mold is filled. The mold is grounded so that the electrical charge on the powdered resin causes the powder to stick to the surface of the mold. The heat of the mold melts the powder and causes it to flow and cure. Sheet molding compound is added to the mold and the mold is heated to cure the SMC resin. The coating and the SMC resin cure so as to form an integral product having a smooth outer surface.

A significant problem associated with the coating of a mold inner surface is that of overspray. The practice of applying an electrostatic charge to the powder as it emerges from a spray gun and grounding the mold surface increases the amount of sprayed powder which adheres to the mold surface. However, even when an electrostatic charge is applied to the powder, very substantial amounts of powder fail to adhere to the mold and are lost as overspray. This overspray must then be collected and reused in order to reduce the cost of the coating process. Whether the powder is reused or not, it must be contained and collected in order to prevent contamination of the surrounding atmosphere. The cost of containing the powder in a spraying room and the cost of collecting the oversprayed powder can be very significant.

U.S. Pat. No. 4,472,451 to Mulder discloses an apparatus for powder coating the interior surface of a heated mold cavity whereby electrostatically charged powder is sprayed onto the surface of the mold which is surrounded by a mask. The mask includes a shield positioned adjacent the shear edge of the mold and vacuum conduits are disposed beneath the shield which engage with vacuum ducts to draw off overspray. The combination of the shield and vacuum conduits are intended to prevent the build-up of the powder on hot surfaces of the mold external of the mold cavity. The overspray recovery apparatus consists of a set of pipes which provide limited evacuation capability and which are susceptible to blockage and associated problems.

SUMMARY OF THE INVENTION

It is an object of the present invention to provide an apparatus for applying a durable coating to the surface of a molded part.

Another object of the present invention is to provide an apparatus which applies a surface coating without post-molding surface treatment of a molded part.

A further object of the present invention is to provide an apparatus which effectively contains and recovers overspray resulting from the spraying of a mold interior surface without significant maintenance problems.

These and other objects of the present invention are attained by the provision of a molding apparatus which comprises a lower mold portion and an upper mold portion movable into engagement with the lower portion. A plurality of movable spraying heads are disposed on a traversing rack mounted within a retractable coating box. The coating box upper surface contains a first opening corresponding in size and shape to the outer periphery of the mold cavity of the upper mold and a second opening which corresponds in size and shape to the opening of an overspray recovery transition piece disposed at a position adjacent the fully disengaged upper mold portion. Prior to a molding operation, the coating box engages the upper mold permitting both the transition piece opening and cavity opening in the top surface of the box to align with the overspray recovery transition piece and mold cavity, respectively. The spray heads and drive of the traversing rack are activated and the overspray recovery transition piece fluidly communicates with an evacuated recovery booth, thereby causing the cavity of the upper mold to be coated and the overspray to be withdrawn into the recovery booth.

The provision of a single transition piece located above the level of the spray guns permits more simple and efficient withdrawal of overspray relative to that provided by a series of small laterally disposed evacuation ports as disclosed in the prior art. Moreover, recovery of overspray is accomplished without problems associated with blockage of evacuation pipes.

Other objects and advantages of the present invention will be more apparent from the following detailed description of preferred embodiments, when taken in conjunction with the drawings.

DETAILED DESCRIPTION OF THE PREFERRED EMBODIMENT

Figure 1:
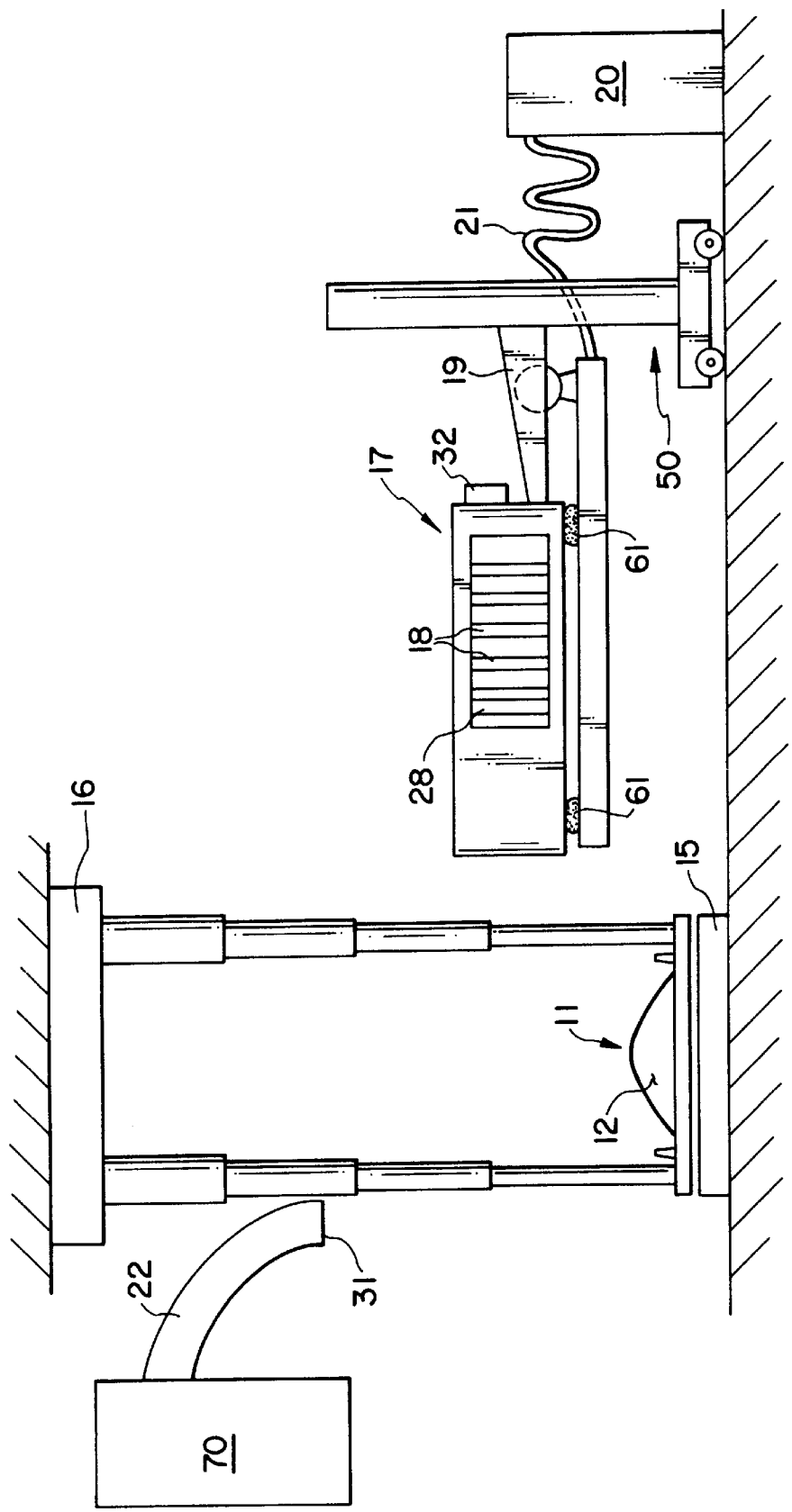
FIG. 1 is a partially diagrammatic view of a molding apparatus in accordance with the present invention.
Figure 3:
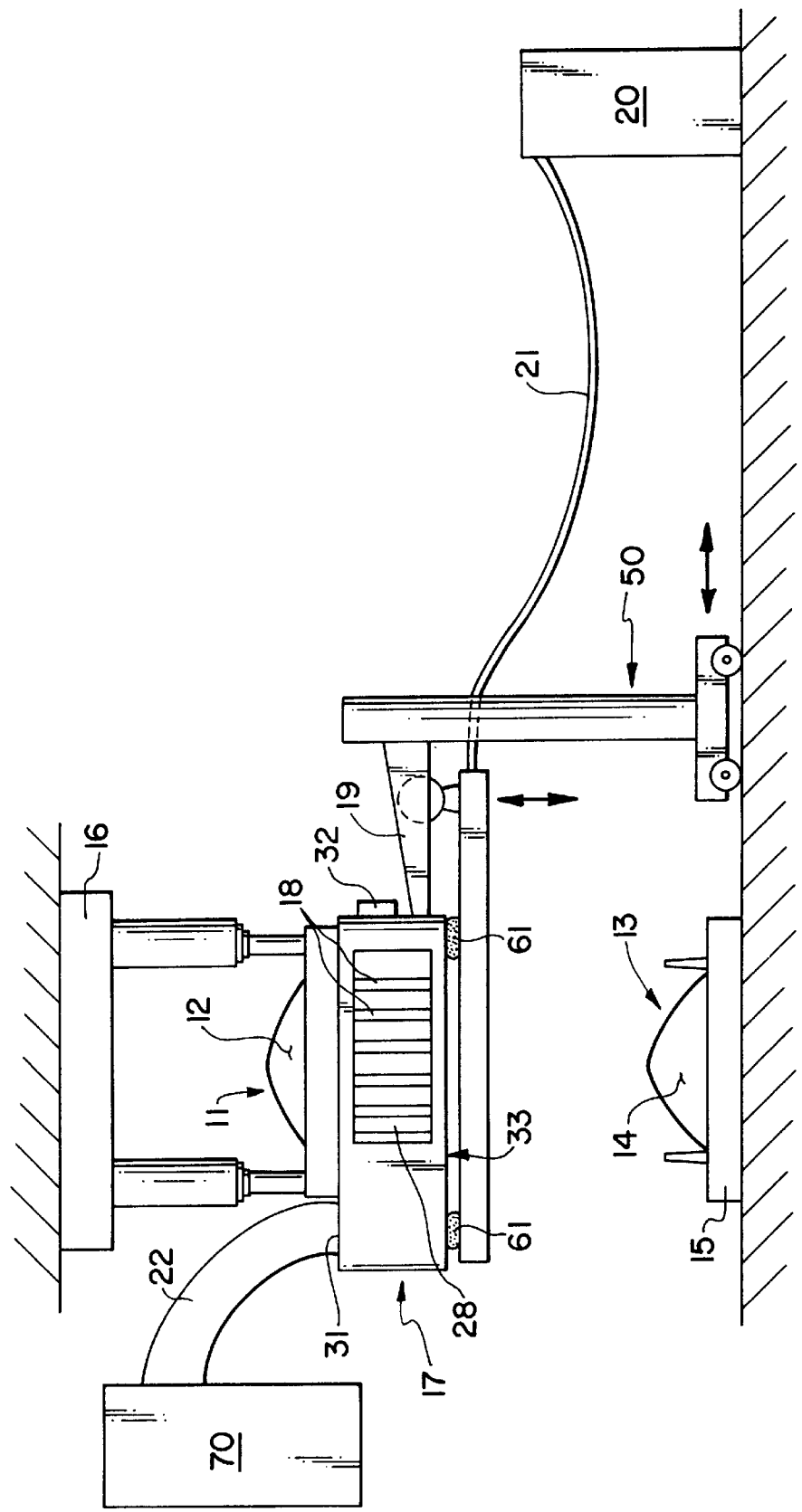
FIG. 3 is a partially diagrammatic view of a molding apparatus in accordance with the present invention wherein the coating box is engaged with the upper mold member.

Referring to FIGS. 1 and 3, the molding apparatus includes an upper mold 11 having cavity 12 which is engageable with a lower mold 13 exhibiting a tool core 14 disposed on a platen 15. When the upper and lower molds 11 and 13 are brought together under pressure, the cavity 12 and tool core 14 cooperate to form a molded part. Prior to a molding operation, a preselected amount of sheet molding compound is placed upon the tool core 14. A press 16 which is disposed above the upper mold 11 moves the upper mold downward into engagement with the lower mold 13. The cavity between the molds which contains the sheet molding compound is evacuated to remove excess air and pressure is applied by the press 16 and maintained until the completion of the cure cycle. The press can be any conventional molding press such as an Erie 2,500 ton vertical molding press which is computer controlled with automatic leveling. After completion of the molding cycle, the press 16 upwardly retracts the upper mold 11, lifting the upper mold from the lower mold and the molded part is removed from the tool core 14 of the lower mold 13.

Coating box 17 is provided for applying a powder coating to the mold cavity 12. Disposed within the coating box 17 are a plurality of powder spraying guns 18. The number of spray guns employed and the spatial arrangement of the guns within the coating box 17 will depend upon the size and shape of the inner mold surface being coated. The spray guns 18 are disposed on a programmable traverse coating rack 19 which moves the activated spray guns across the inner mold surface or cavity 12, thereby permitting deposition of an even powder coating of the desired thickness on the inner surface of the cavity 12. An example of a part readily produced with a molding apparatus in accordance with the present invention is the hull of a jet ski boat which is to exhibit a colored exterior surface. For coating a cavity used to produce such a part with the desired colored thermoplastic resin powder, a total of fifteen spray guns are arranged in several rows and the firing of each gun is individually controlled using conventional control devices. The traverse coating rack 19 is programmed to make two passes across the surface of the cavity 12 over a 45 second period in order to deposit a powder layer of approximately 0.005 inches of powder on the surface of the cavity 12.

The powder spray guns 18 are of a conventional type that will impart an electrostatic charge to the powder being applied to the mold inner surface, here the inner surface of cavity 12. The electrostatic charge promotes adhesion of the powder to the mold inner surface, thereby minimizing the amount of overspray which must be removed from the coating box and facilitating the buildup of powder on the mold surface to the desired thickness.

The spray guns are connected to a powder coat feed hopper 20 by means of individual hoses 21. The powder is fed into the hopper from a feed drum attached to a vibrating system which reduces agglomeration of powder into clumps which cannot be used in the spray process. A rotary sieve and cyclone system (not shown) are positioned above the hopper to remove large particles. A porous bed is located in the bottom of the hopper 20 and air is blown up through the powder to fluidize the powder prior to feeding to the spray guns.

Overspray recovery transition piece 22 is disposed adjacent the position occupied by the upper mold 11 when the upper mold is in a fully retracted position as shown in FIG. 3.

Figure 2:
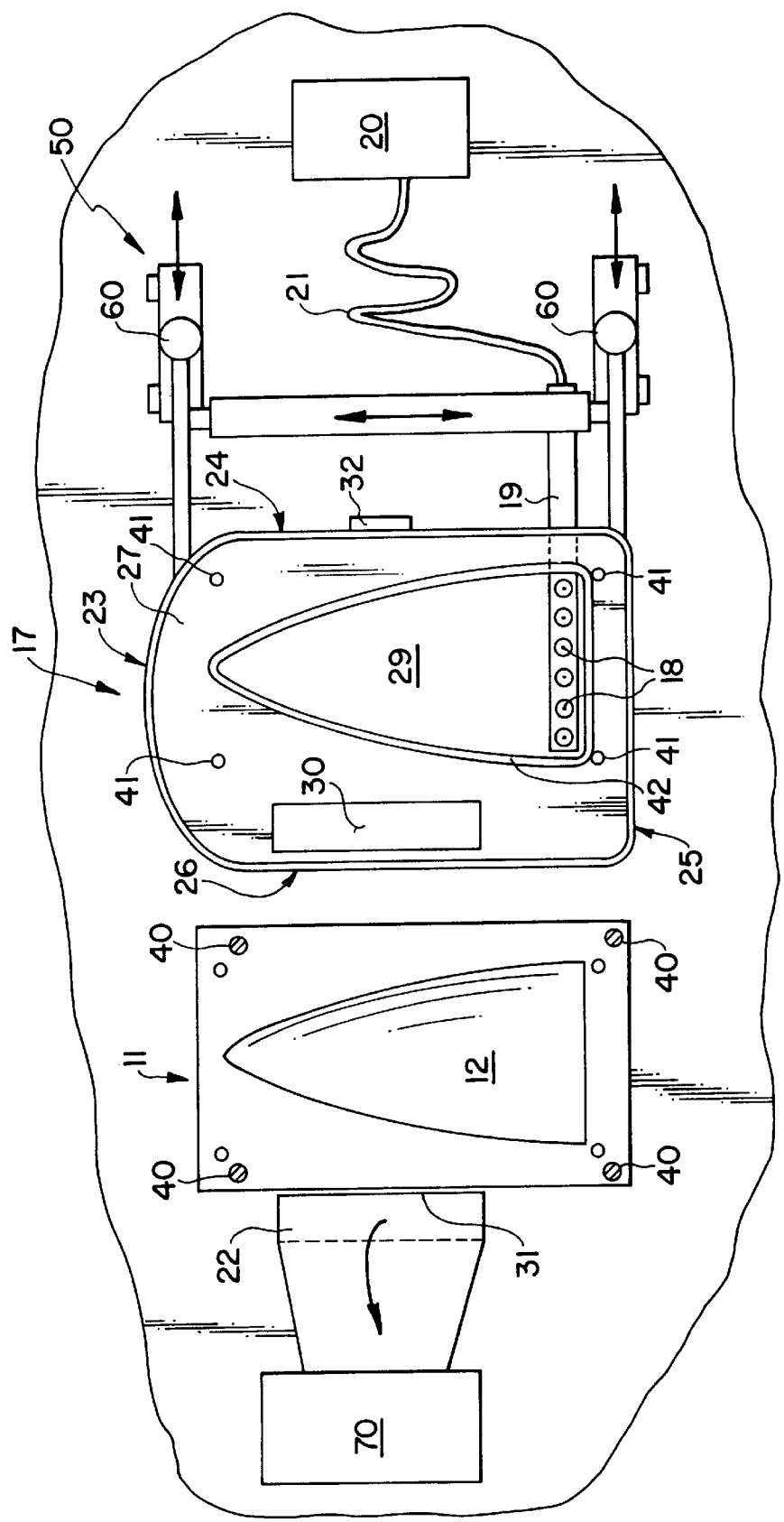
FIG. 2 is a top plan view of a molding apparatus in accordance with the present invention.

As shown in FIG. 2 and 3, the coating box 17 exhibits four side surfaces 23, 24, 25 and 26, a top surface 27, and a bottom surface 33. The four side surfaces and the top and bottom surface confine oversprayed powder to the coating box region when the spray guns 18 are operating and minimize ambient turbulence which can result in uneven coating. These surfaces are provided with openings 28 which permit easy access and viewing for maintenance purposes, but which are closed with sliding door coverings during a coating operation.

The top surface 27 is longer and wider than the upper mold 11 and exhibits two openings 29 and 30. opening 29 is of a size and shape corresponding to the size and shape of the outer periphery of the upper mold cavity 12. Opening 30 is of a size and shape corresponding to the periphery of the open end 31 of the overspray recovery transition piece 22. Openings 29 and 30 are located in positions in the top surface 27 of coating box 17 such that the openings align with the outer periphery of the upper mold cavity 12 and the open end 31 of the overspray recovery transition piece 22, respectively, when the top surface of the coating box engages the upper mold 11. Alignment of the respective openings is assured by the placement of downwardly-extending leader pins 40 on the upper mold 11 which are engageable with corresponding sockets 41 in the top surface 27 of the coating box 17. A resilient gasket 42 is disposed on the top surface 27 of the coating box 17 along the periphery of the first opening 29 for purposes of creating a seal between the upper mold and the coating box which prevents escape of excess powder from the coating box.

Since airborne powder within the box is ignitable, the coating box is supplied with a conventional ignition detector 32 which shuts off the coating box powder supply in the event ignition is detected.

The coating box 17 is disposed on shuttle 50 which is programmed to automatically move the coating box laterally from a position outside the press area to a position directly beneath the upper mold 11 before a coating operation and to remove the coating box 17 from the press area at the completion of a coating operation.

The shuttle 50 exhibits a lifting mechanism comprising external pneumatic cylinders 60 and a counter weight drive system for lifting the coating box 17 upward toward the upper mold 11 prior to a coating operation and lowering the coating box away from the upper mold after the completion of a coating operation. Four pneumatically controlled inflatable bladders 61 are disposed on the shuttle beneath the coating box at the four corners of the coating box. The bladders 61 can be partially inflated to lift the coating box off of the shuttle frame prior to the lifting of the coating box upward by the pneumatic cylinders. The partial inflation of the bladders 61 permits slight lateral movement of the coating box which facilitates mating of the leader pins 40 with their respective sockets 41 by eliminating the need for precise alignment of the leader pins and sockets prior to engagement of the coating box with the upper mold. The shuttle lifting mechanism then lifts the coating box into contact with the mold and the bladders are fully inflated causing the coating box to engage the upper mold and resulting in compression of the gasket 42.

In operation, once the coating box 17 is fully engaged with the upper mold 11, the powder spraying guns 18 are activated and the traverse coating rack 19 is driven to cause the spraying guns 18 to move across the mold inner surface. At the same time, a vacuum is drawn through the overspray recovery transition piece 22 causing excess powder to be removed from the coating box to the powder recovery booth 70. The powder recovery booth 70 is provided with a series of air filters which prevent contaminants from entering the booth. When the predetermined spraying cycle has been completed, the bladders 61 are deflated causing the coating box 17 to unseat from the upper mold 11. The shuttle lifting system lowers the coating box further and the shuttle, carrying the coating box, is retracted from the press area.

Although the invention has been described and illustrated in detail, it is intended to be clearly understood that the above is to be taken by way of illustration and example only and not by way of limitation. The spirit and scope of the invention are to be limited only by the terms of the appended claims.

What is claimed is:

1. Apparatus for coating a molded article comprising,
   a) a first mold member,
   b) a second mold member, wherein said second mold member is movable between two positions, one position in engagement with said first mold member and a retracted position not in engagement with said first mold member, each said mold member having an interior molding surface, said interior molding surfaces defining a space therebetween when said mold members are engaged,
   c) a single overspray transition piece having an open end disposed adjacent said second mold member when said second mold member is in a fully retracted position, said overspray transition piece being connectable with a vacuum source,
   d) an enclosed coating box movable into engagement with said second mold member, said coating box having an upper surface including a first opening and an adjacent second opening, said first opening aligning with said interior molding surface of said second mold member and said second opening automatically aligning with said open end of said overspray transition piece when said coating box and said second mold member are engaged to automatically seal said coating box, and
   e) a spraying device disposed in said coating box, said spraying device in fluid communication with a fluidized material feed hopper and adapted to be positioned adjacent said interior molding surface of said second mold member and said first opening and below said second opening and said overspray transition piece.

2. An apparatus according to claim 1, wherein said first mold member has a convex interior molding surface and the second mold member has a concave interior mold surface.

3. An apparatus according to claim 1, further comprising a recovery booth in fluid communication with said overspray transition piece for collecting overspray.

4. An apparatus according to claim 1, further comprising a vacuum source in fluid communication with said overspray transition piece.

5. An apparatus according to claim 1, further comprising a drive shuttle for moving said coating box into engagement with said second mold member.

6. An apparatus according to claim 5, wherein said drive shuttle includes a pneumatic lift for lifting said coating box into engagement with said second mold member.

7. An apparatus according to claim 6, wherein said drive shuttle further includes a plurality of bladders for lifting said coating box into engagement with said second mold member.

8. An apparatus according to claim 6, including a press for moving said second mold member.

9. An apparatus according to claim 1, wherein said second mold member and said coating box include aligning pins for aligning said coating box with said second mold member.

10. An apparatus according to claim 9, wherein said aligning pins comprises at least one leader pin disposed on said second mold means and at least one socket in said coating box.

11. An apparatus according to claim 1, wherein said second mold member is downwardly movable into engagement with said first mold member.

12. An apparatus according to claim 1, wherein said spraying device comprises at least one spray gun.

13. An apparatus according to claim 12, wherein said at least one spray gun comprises 15 spray guns.

14. An apparatus according to claim 1, wherein said spraying device is disposed on a power-driven coating rack.

15. An apparatus according to claim 1, including a resilient gasket positioned between said coating box and said upper mold member to form a seal therebetween.

16. An apparatus according to claim 1, wherein said coating box includes a plurality of sidewalls and a bottom surface for enclosing said spraying device.

17. An apparatus according to claim 16, wherein at least one of said plurality of sidewalls has an access opening and a movable door for covering said opening.

18. Apparatus for coating a molded article comprising,
   a) a first mold member;
   b) a second mold member, wherein said second mold member is movable between two positions, one position in engagement with said first mold member and a retracted position not in engagement with said first mold member, each said mold member having an interior molding surface, said interior molding surfaces defining a space therebetween when said mold members are engaged and wherein said first mold member has a convex interior molding surface and said second mold member has a concave interior surface;
   c) a single overspray transition piece having an open end disposed adjacent said second mold member when said second mold member is in a fully retracted position, said overspray transition piece being connectable with a vacuum source;
   d) an enclosed coating box movable into engagement with said second mold member, said coating box having an upper surface including a first opening and an adjacent second opening, said first opening aligning with said interior molding surface of said second mold member and said second opening automatically aligning with said open end of said overspray transition piece when said coating box and said second mold member are engaged, to automatically seal coating box wherein said second mold member and said coating box include aligning pins for aligning said coating box with said second mold member;
   e) a spraying device disposed in said coating box, said spraying device in fluid communication with a fluidized material feed hopper and adapted to be positioned adjacent said interior molding surface of said second mold member and said first opening and below said second opening and said overspray transition piece, wherein said coating box includes a plurality of sidewalls and a bottom surface for enclosing said spraying device, and wherein at least one of said plurality of sidewalls has an access opening and a movable door for covering said opening; and
   f) a drive shuttle for moving said coating box into engagement with said second mold member, wherein said drive shuttle includes a plurality of bladders for lifting said coating box into engagement with said second mold member.

* * * * *